United States Patent [19]  [11]  4,194,614
Hrivnak  [45]  Mar. 25, 1980

[54] CONVEYOR-BELT SYSTEM

[75] Inventor: John G. Hrivnak, Ringwood, N.J.

[73] Assignee: Sandvik Conveyor GmbH, Fellbach, Fed. Rep. of Germany

[21] Appl. No.: 804,256

[22] Filed: Jun. 7, 1977

[30] Foreign Application Priority Data

Jun. 9, 1976 [DE] Fed. Rep. of Germany ....... 2625755

[51] Int. Cl.² .............................................. B65G 47/46
[52] U.S. Cl. .................... 198/487; 198/597; 198/742
[58] Field of Search ............... 198/350, 366, 367, 370, 198/372, 487, 597, 598, 742

[56] References Cited

U.S. PATENT DOCUMENTS

| 2,001,332 | 5/1935 | Ross | 198/487 |
| 2,139,118 | 12/1938 | Governale | 198/487 |
| 3,198,308 | 8/1965 | Driesch et al. | 198/372 |
| 3,200,930 | 8/1965 | Blackwood | 198/487 |
| 3,858,712 | 1/1975 | Sluysmans | 198/350 |

FOREIGN PATENT DOCUMENTS 1451889 10/1976 United Kingdom .................... 198/742

Primary Examiner—Jeffrey V. Nase
Attorney, Agent, or Firm—Harold L. Stults; Pasquale A. Razzano

[57] ABSTRACT

A conveyor system formed by a main steel belt conveyor which carries items from a receiving station to any one of a number of discharge conveyors which extend to different destinations. A mechanism is provided in each of the discharge conveyors which pushes items from the main conveyor onto the discharge conveyor. The mechanism has a pusher arm which is supported by a rod assembly so as to be moved across the main conveyor downstream from the unloading zone while extending upwardly away from the main conveyor. It is then swung down on the far side of the item and pushes the item onto the discharge conveyor.

1 Claim, 8 Drawing Figures

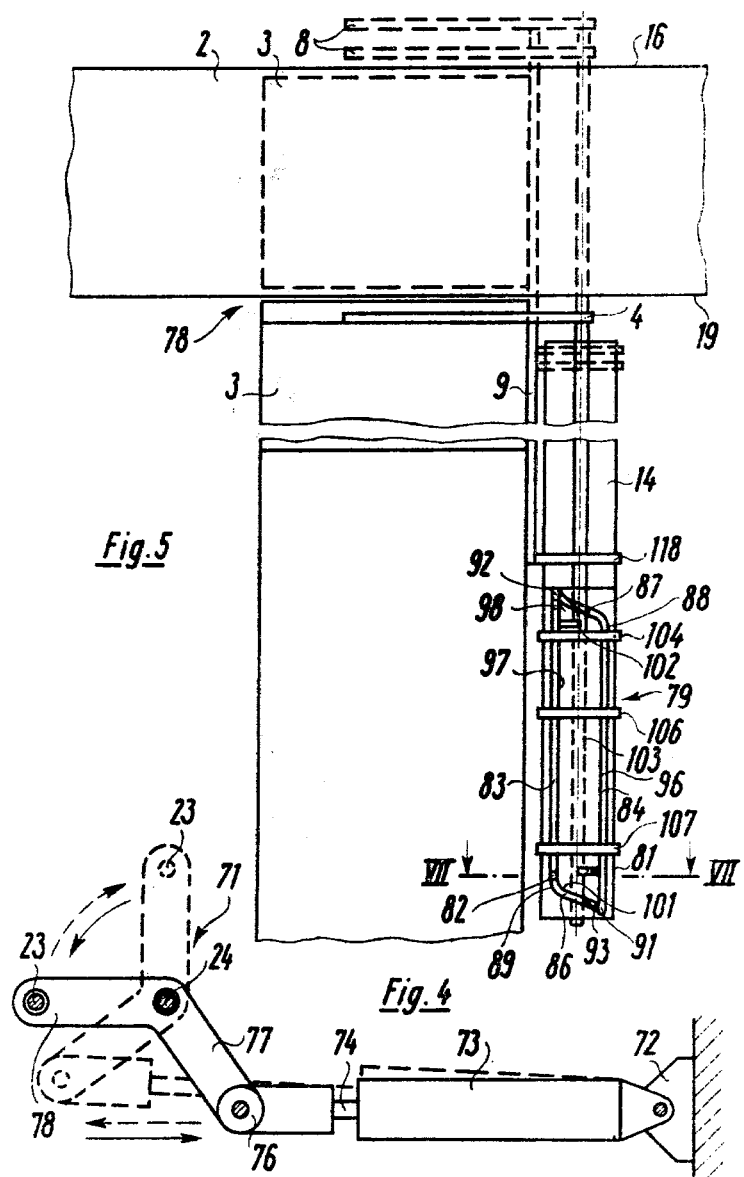

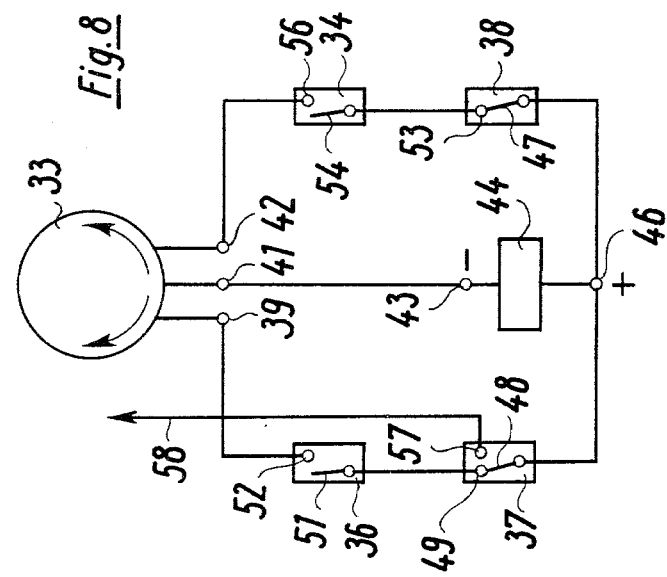
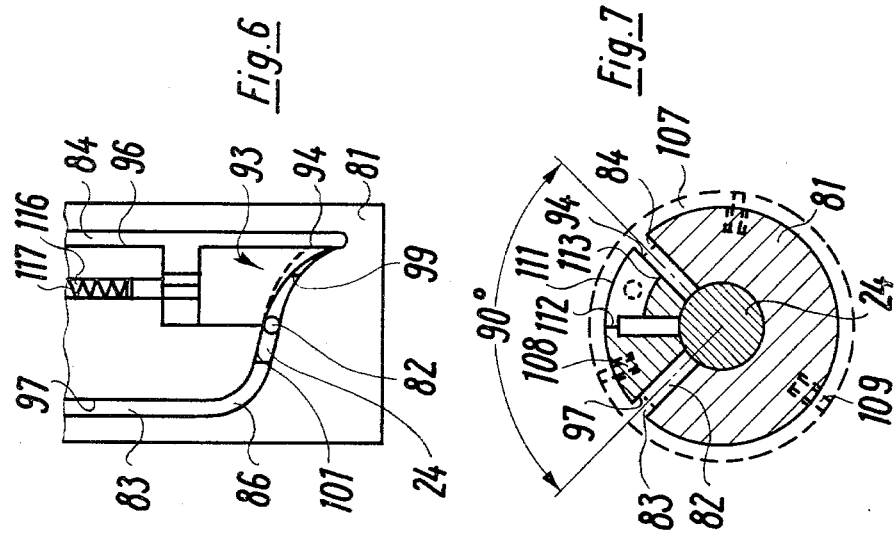

CONVEYOR-BELT SYSTEM

This invention relates to a conveyor belt appliance for piece goods and luggage, with a main conveyor belt and a transverse conveyor belt running at right angles thereto, onto which the piece goods are deflected by means of an angle pusher which has an outer arm lying parallel to the main conveyor belt and a striker arm lying parallel to the transverse conveyor belt, where the displacement movement of the angle pusher, which is moved into its starting position across the main conveyor belt in front of the conveyed item which is to be deflected, is initiated at the latest when the conveyed item is resting against the striker arm lying parallel to the transverse conveyor belt.

Conveyor belt appliances of this kind are known and are used in railway stations, airports and also in warehouses. They are generally automated, the deflecting process being initiated by control signals which are derived from magnetized points on a main conveyor belt constructed as a steel belt, which are located in front of the conveyed item to be deflected, and signal to indicate onto which of several transverse conveyor belts the conveyed item should be deflected. When such a control signal occurs a hydraulic or pneumatic working cylinder is loaded and moves the angle pusher, the outer arm of which is arranged in its initial position on the side of the main conveyor belt nearest to the transverse conveyor belt so that the conveyed items can pass by in front on the main conveyor belt, into its appropriate position for the deflecting process, in which its striker arm lies across the main conveyor belt and the outer arm lies parallel and horizontal to the longitudinal side of the main conveyor belt which is furthest from the transverse conveyor belt. Both in its normal position and also in the starting position for the pushing process and during movement into this starting position the outer arm is arranged horizontally. This leads to an undesirable limitation of the conveying capacity of the whole conveyor belt appliance since there must be a minimum gap between consecutive conveyed items so that the angle pusher with its outer arm which extends in the direction of the main conveyor belt can be moved through between the conveyed items into its starting position on the other side of the main conveyor belt. For reasons of more reliable operation the length of this outer arm is generally chosen somewhat greater than half the length of the conveyed items measured in the conveying direction. As the deflecting process, i.e. the drawing back of the angle pusher in the direction of the transverse belt, should not be initiated until the conveyed item is resting adequately on the striker arm of the angle pusher in order to ensure exact positioning, a period of time is needed for the deflecting process which is at least equal to the length of the outer arm divided by the conveying speed of the main conveyor belt, increased by the amount of time which is needed for the unloaded angle pusher to cross over the main conveyor belt, plus the amount of time which is needed for its return, loaded with the conveyed item to be deflected. This time, multiplied by the conveying speed of the main conveyor belt, gives the minimum gap between two consecutive conveyed items which must be maintained so that a correct deflecting process can take place. This minimum gap lies in the order of double the length of the items normally conveyed, which means on the other hand that the theoretically possible belt capacity can at most be 50% exploited, and in most instances a still smaller percentage can be exploited. In addition to this, conveyed items of more than average length can arrive at an undesirable oblique position with an angle pusher which has an outer arm only approximately half the length of the average length of the items normally conveyed.

It is therefore the task of the invention to create a conveying appliance with increased conveying capacity, which makes possible in addition a more exact positioning of the conveyed item on the transverse belt and which does not cost very much more to produce than the known conveying appliances. This task is solved according to the invention in that the angle pusher can be pivoted out of the position appropriate for its deflecting movement by at least 90°, so that its outer arm, which lies parallel to the conveying direction of the main conveyor belt during at least part of the deflecting movement, stands perpendicular to the plane of the main conveyor belt or forms an angle with this of more than 90°, and that a control device is provided which pivots the angle pusher at the end of the deflection movement into the position perpendicular to the conveying plane, holds it during the advance movement into its starting position in this perpendicular position and pivots it back at the end of its advance movement into the approximately horizontal position suitable for the deflection process, and holds it in this position during the deflection movement.

The invention makes it possible to control the operating sequence in such a way that after a first deflecting process the outer arm of the angle pusher is immediately pivoted into its position perpendicular to the conveying plane, in which it is moved away over the main conveyor belt into its outer position when a control signal for the deflection process occurs, and as soon as it has reached the vicinity of the outer edge of the main conveyor belt it is pivoted into its horizontal position. These pivoting sequences can be carried out within a period of time which, when multiplied by the conveying speed of the main conveyor belt, corresponds to only a very short length of conveyor belt, i.e. a very short necessary minimum gap between the consecutive conveyed items. As the pivoting processes can take place very quickly, the minimum gap which must be maintained between two consecutive conveyed items is reduced in a conveyor belt appliance according to the invention to the gap which is obtained from the sum of the times required for the advance movement of the angle pusher into its starting position and its return movement deflecting the item onto the transverse belt, multiplied by the speed of the conveyor belt. The length of the outer arm which in the known conveying appliances is added to the minimum distance between two consecutive conveyed items, can virtually be discounted in the conveying appliance according to the invention. The conveyor belt capacity is therefore increased with the invention by an amount in the order of 50%. A further advantage of the invention consists in the fact that the length of the outer arm of the angle pusher can be chosen virtually the same as the average length of the conveyed items, without reducing the conveying capcity. In this way more exact positioning of large conveyed items is also achieved.

Further advantages of the invention which can be attained due to the characteristics of the subsidiary Claims are the following:

Further details and characteristics of the invention will become apparent from the following description of construction examples, with reference to the Drawing.

FIG. 4 shows a control gear with a similar effect, constructed as a lever at a section corresponding to FIGS. 2 and 3.

FIG. 5 shows a conveyor appliance generally corresponding to FIG. 1, with a connecting link guide linked to the working cylinder as a control device for the pivoting movement of the angle pusher, viewed from above.

FIG. 6 shows part of the connecting link guide of the conveyor appliance according to FIG. 5.

FIG. 7 is a section through the connecting link guide along the line VII—VII in FIG. 5.

FIG. 8 is a simple control circuit with limit switches.

Figure 1:
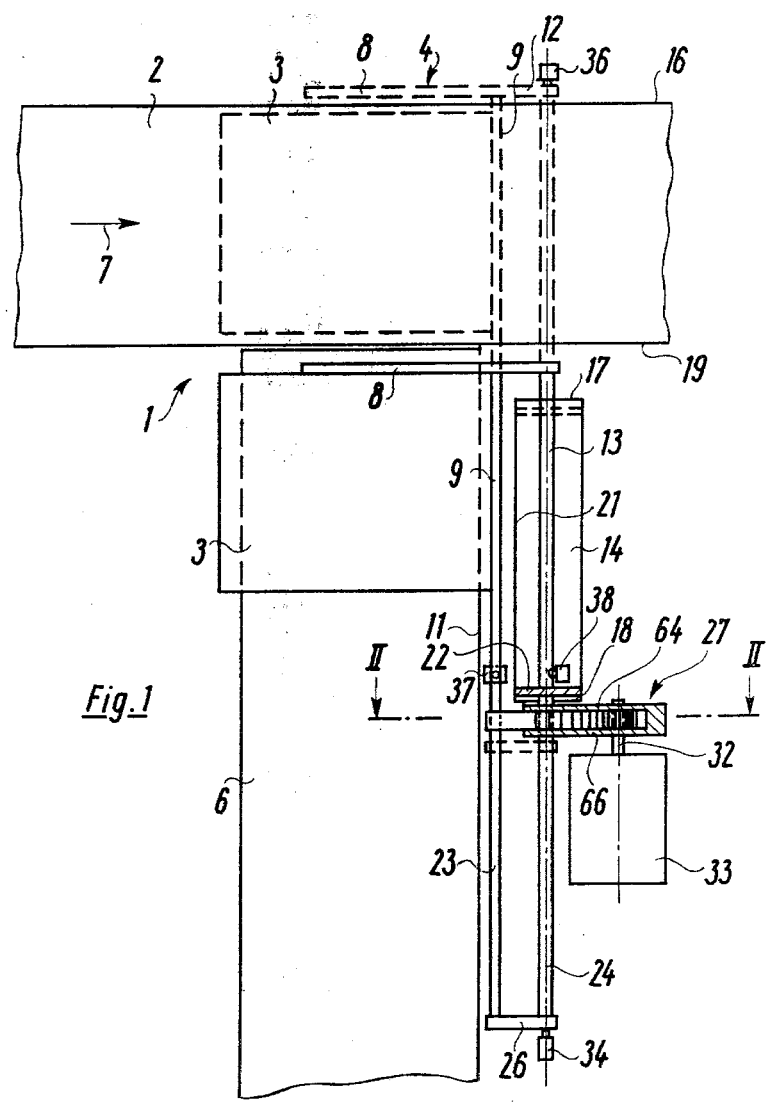
FIG. 1 is a conveyor belt appliance according to the invention with a control device with a control motor and a cogwheel gear.

In FIG. 1 a branching point 1 of a larger conveyor belt system is shown, at which conveyed items 3 which are conveyed to this point on a main conveyor belt 2, are deflected by means of an angle pusher 4 onto a transverse conveyor belt 6 which runs at right angles to the main conveyor belt 2. Lying parallel to the conveying direction of the main conveyor belt 2, on which the conveyed goods are transported in the direction of the arrow 7, the angle pusher 4 has an outer arm 8, the lengrh of which is chosen somewhat smaller than the average length of the conveyed items 3, measured in the conveying direction. This outer arm 8 is permanently connected at right angles to a striker arm 9 which extends at a small lateral distance from the edge 11, (on the right in the Drawing) of the transverse conveyor belt 6, and lies parallel to this. The outer arm 8 of the angle pusher 4 is extended out beyond the striker arm by a short piece 12, the end of which is permanently connected to a push rod 13 of a hydraulic or pneumatic drive cylinder 14, which drives the angle pusher. The length of the displacement path which can be achieved with this working cylinder 14 is such that the outer arm 8 of the angle pusher can be moved out of the position shown in the Drawing in fully-drawn lines, in which it lies across the section of the transverse conveyor belt 6 which is immediately adjacent to the main conveyor belt, into the outer position shown in dashed lines, in which the outer arm 8 lies a short way outside the outer edge 16 of the main conveyor belt 2. The working cylinder, the working axis of which runs at right angles to the main conveyor belt 2, is arranged right in the corner area which is defined by the inner longitudinal edge 19 of the main conveyor belt 2 and the inner longitudinal edge 11 of the transverse conveyor belt 6.

The striker arm 9, which lies in the position shown between the cylinder housing 21 of the working cylinder 14 and the right-hand longitudinal edge 11 of the transverse conveyor belt 6, and the push rod 13 of the working cylinder which is mounted movably and rotatably in the end walls 17 and 18 of this, are formed as round steel rods or steel tubes with a normal cross-section. The length of the striker arm 9 and the push rod 13 is the same and is chosen somewhat more than double the length of the path of the angle pusher 40, so that the push rod or its extensions arranged on the other side of the piston 22 of the working cylinder 14 is located in the outer end wall 18 of the working cylinder 14 in every position of the angular pusher, and between a bridge 26 connecting the two outer end sections 23 and 24 of the striker arm 9 and the push rod 13 and the end wall 18 there is still sufficient room for a control device 27, which acts on the push rod 13 and makes possible a pivoting movement of the angle pusher 4 from the horizontal position shown into a position at right angles to this, in which the outer arm 8 is pointing vertically upwards.

Figure 2:
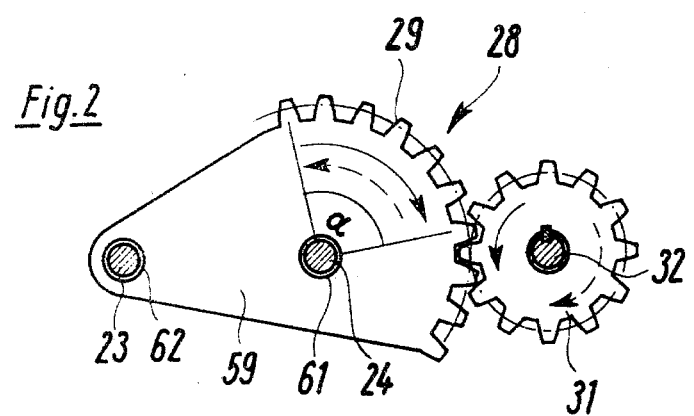
FIG. 2 shows the cogwheel gear of the conveyor appliance according to FIG. 1 in a section along the line II—II in FIG. 1.

The control device 26 contains a cogwheel gear 28 shown in FIG. 2 with a toothed segment 29 which is concentric with the end section 24 of the push rod 13, its teeth extending over somewhat more than the pivot angle of the angle pusher 4, and engaging inside the pivot area with a cogwheel 31, which is keyed to and thereby rotationally fixed on the drive shaft 32 of an electrical drive motor 33 with a reversible direction of rotation. Rod 13 and arm or shaft 9 form the sides of a parallelogram and are interconnected rigidly at their ends by bridge 26 and arm 8. When segment 29 is swung from and to the position shown in FIG. 2, arm 8 and bridge 26 swing from their horizontal position to and from a vertical relationship. Hence, while end section 24 of rod 13 is not keyed to or directly fixed to segment 29, the segment and rod are coupled rotationally so that the rod turns with segment 29. In that way, outer arm 8 is swung between its vertical position, in which it is moved across the conveyor, in front of an item to be discharged from the conveyor to its horizontal position which is shown in broken lines in FIG. 1. The current supply to the drive motor 33 is controlled by limit switches 34, 36, 37 and 38, which are activated in the terminal positions of the displacement movement of the angle pusher 4 and in its pivoting terminal positions. The two limit switches 34 and 36 which control the outwards and inwards pivoting of the angle pusher 4 are arranged in alignment with the axis of the push rod 13 or its extension 24, and are held in their ON position for as long as the push rod is rotating. The two limit switches 37 and 38 which switch off the drive motor 33 are both arranged approximately in the plane in which thrust piston 22 is located in its furthest drawn-in position, in which the conveyed item 3 is pushed onto the transverse conveyor belt 6. One of the limit switches 37 is in its OFF position as long as it is actuated by the striker arm 9, when the angle pusher 4 is in its horizontal pivot position, i.e. as long as the conveyed item 3 is being deflected. The second limit switch 38, which switches off the outward movement of the angle pusher 4, is also actuated by the striker arm 9 and is held in its OFF position as long as the end section of the striker arm 9 is resting against its actuating member.

A simple switching of the current supply to the drive motor 33 is shown in FIG. 8. The drive motor 33 is constructed in the construction example shown as a direct current motor with three connection points 39, 42 and 41, the central connection point 41 being connected to the minus pole 43 of a direct current supply source 44. Depending on which of the connection points 39 or 42 is connected to the plus pole 46 of the current source, via the limit switches 34, 36, 37 and 38, the drive motor 33 is loaded in one or other of the directions of rotation. The plus pole 46 of the direct current source 44 is connected to the movable contacts 47 and 48 which can be actuated by the striker arm 9 and appertain to the two limit switches 38 and 37 for switching off the pivoting movement of the angle pusher 4. The fixed contact 49 of the limit switch 37 which switches off the downwards pivoting movement, is connected to the movable contact 51 of the limit switch 36 which switches on the downwards pivoting movement, its fixed contact 52 being connected to one of the connection points 39 of the drive motor 33. The fixed contact 53 of the limit switch 38 for switching off the upwards pivoting movement of the angle pusher 4 is connected to the pivoting contact 54 of the limit switch 34 for switching on the upwards pivoting movement, its fixed contact 56 being connected to the other connecting point 42 for the plus voltage.

The operating sequence of this circuit is as follows:

As long as the angle pusher 4 in its horizontal position is pushing the conveyed item 3 onto the transverse conveyor belt 6, the limit switch 37 for switching off the downwards pivoting movement and the two limit switches 38 connected to the plus connecting points 39 and 42 of the drive motor 33 with their fixed contacts 52 and 56 are closed. At the end of the displacement movement determined by the thrust path of the working cylinder 14 the limit switch 34 connected to the second plus connecting point 42 of the drive motor 33 is closed by the bridge 26 or the extension 24 of the push rod 13 running against it, and the drive motor 33 is loaded in one of its directions to pivot the angle pusher 4 upwards. The pivoting movement is switched off as soon as the striker arm 9 opens the limit switch 38 and thus interrupts the supply of plus voltage to the drive motor 33. When a control signal is given by a signalling device (not shown) for the working cylinder 14, the angle pusher is moved in this perpendicular position outwards over the main conveyor belt 2, and the previously closed limit switch 34 returns to its initial open position. The limit switch 37 for switching off the downwards pivoting movement has also fallen back into its initial position beforehand, so that the positive voltage of the current source 44 is already being applied again to the open limit switch 36 for switching on the downwards pivoting movement. This limit switch 36 is closed as soon as the extension 12 of the outer arm 8 runs up against it at the end of the outwards thrust movement of the angle pusher 4. The control drive motor 33 is now loaded in the other direction of rotation, the angle pusher 4 pivots downwards and a striker arm 9 opens the limit switch 37 as soon as it has reached its horizontal pivoting position. This limit switch 37 can be fitted with a second fixed contact 57 so that a control signal for the deflecting pushing movement of the angle pusher 4 can be conducted via a lead 58. The limit switch 37 remains in its open position until it falls into its closed position again due to the upwards pivoting movement of the angle pusher initiated by actuation of the limit switch 34, thus completing the cycle.

The mechanical devices of the control device operated, for example, by this circuit, are shown in greater detail in FIGS. 1-4. The toothed segment 29 has an approximately triangular plate-shaped basic element 59, with a first bore 61 arranged in the center of curvature of the teeth in which the extension 24 of the push rod 13 slides. The extension 23 of the striker arm 9 slides similarly in its second bore 62, arranged at the distance of the striker arm 9 from the push rod 13. With these two form-locked guides a whole rotationally fixed assembly of the toothed segment 29 on the extension 24 of the push rod 13 is achieved. The position of the toothed segment shown in FIG. 2 corresponds to the horizontal pivot position of the angle pusher 4. In this position the striker arm 9, the push rod 13 and the drive shaft 32 of the drive motor 33 are arranged in a common plane. The effective part of the cogs of the toothed segment 29 is held in position directly adjacent to the working cylinder 14, between the two arms 64 and 66 which run at right angles to the thrust movement of the push rod 13 in parallel vertical planes, and which appertain to a bearing housing 67 with an approximately U-shaped horizontal cross-section. The drive shaft 32 of the drive motor 33 with the drive cogwheel 31 is also mounted in this bearing housing, which has bores aligned with the central bore 61 of the toothed segment 29, with greater clear cross-sections through which the extension 24 of the push rod can penetrate.

Figure 3:
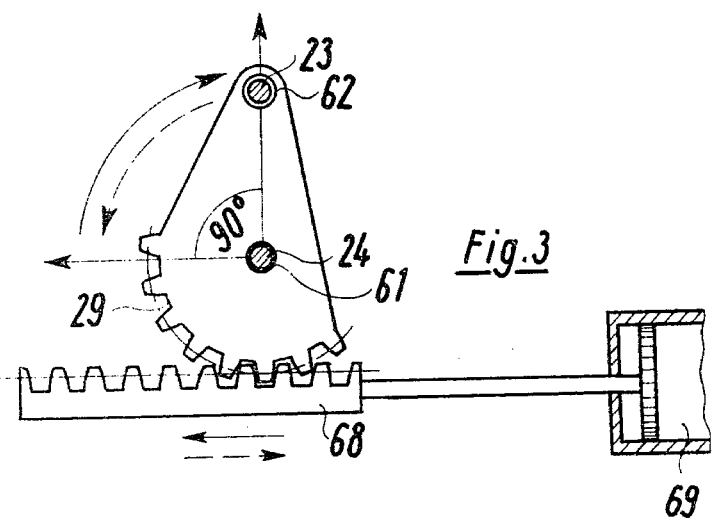
FIG. 3 shows a control gear driven by a hydraulic cylinder with a toothed segment and a toothed rack, at a section corresponding to FIG. 2.

In the construction form of the control gear shown in FIG. 3, the same toothed segment 29 is arranged so that the effective part of its cogs runs underneath the bore 61 for the push rod 13. The cogs engage with a rack 68 which can be moved horizontally below the plane of the transverse conveyor belt 6, and which is driven by a fixed second hydraulic or pneumatic drive cylinder 69. The means for the exact horizontal guiding of the rack 68 are not shown. Obviously, with the use of a working cylinder 69 of this type the supply of the working medium to the working cylinder 69 can be controlled with the aid of the limit switches 34–38.

With the construction form shown in FIG. 4, the control grear is constructed as a link gear, which contains a two-armed lever 71 mounted in the same way as the toothed segment 29 on the extensions 23 and 24 of the striker arm 9 and the push rod 13 and which is driven by a hydraulic drive cylinder 73 which can be pivoted around a fixed linkage 72, and the push rod 74 of which is connected via a pivot joint 76 to the free end of the power arm 77 of the two-armed lever. The pivot position shown in fully-drawn lines in FIG. 4 corresponds to the horizontal position of the angle pusher 4, and the position shown in dashes corresponds to its vertical pivot position. The power arm 77, which is approximately the same length as the load arm 78 of the two-armed lever, forms with this an angle of approximately 135° and runs out from the pivot axis 24 constantly downwards, so that without additional guide means a clearly defined co-ordination of the pivoting movement of the angle pusher 4 with the thrust movement of the working cylinder 73 is constantly ensured.

The conveyor belt appliance 78 shown in a complete view in FIG. 5 and in detail in FIGS. 6 and 7 differs from that shown in FIG. 1 mainly in that the control of the pivoting movements of the angle pusher 4 is carried out in a purely mechanical manner via a connecting link 79 which is connected directly to the working cylinder 14 on the side of this furthest from the main conveyor belt 2. The connecting link guide 79 holds a guide cylinder 81 which is coaxial to the housing of the working cylinder 14 and is connected mechanically fixed to this, and has the extension 24 of the push rod 13 movable inserted in it. The clear internal cross-section of the guide cylinder 81 is adapted to the cross-section of the extension 24 of the push rod 13 in such a way that this can slide in the guide cylinder 81 with the required small amount of play. The extension 24 of the push rod 13 is fitted with a radially projecting guide pin 82 which projects into interconnecting guide slits 83, 84, 86 and 87 of the guide cylinder 81, the clear width of which is similarly adapted to the diameter of the guide pin with the necessary guiding play. The two guide slits 83 and 84 extend in the displacemen direction of the angle pusher 4 and run parallel to each other at an angular displacement corresponding to the pivoting angle of the angle pusher of 90°. They are connected to each other in the vicinity of the end section by the guide slits 86 and 87 which run at an inclination of approximately 30°-45° to the longitudinal axis of the guide cylinder 81 and open out tangentially in the guide slits 83 and 84 which run in the displacement direction of the angle pusher 4. The straight guide slits 83 and 84 which run parallel to each other are arranged symmetrically to the vertical longitudinal central plane of the guide cylinder 81. The guide pin 82 which is inserted in the lef-hand guide slit 83 in the horizontal position of the angle pusher 4 and in the right-hand guide slit 84 in the vertical pivot position is correspondingly off-set by 45° in relation to the direction of the outer arm 8 of the angle pusher 4, as can be seen in FIG. 7. In the middle pivot position of the guide pin 82 in the outer pivot guide slit 86 as shown in FIG. 6, the outer arm 8 of the angle pusher 40 projects upwards at 45°. The length of the straight guide slits 83 and 84 between the connections of the curvature points 88 and 89 at which the longitudinal guide slits 83 and 84 each bend round into the curved guide slits 86 and 87, is made equal to the width of the main conveyor belt 2, so that the pivoting movements, which take place with a simultaneous further displacement transverse to the main conveyor belt 2, are initiated when the outer arm 8 of the angle pusher 4 crosses over the longitudinal edges 16 and 19 of the main conveyor belt 2. The stroke length of the piston 22 of the working cylinder 14 must be longer by the axial length required for the pivot movement in the construction form shown in FIG. 1.

The operating cycle of the conveyor belt 78 with the connecting link guides 79 is as follows: In the starting position the guide pin 82 is located at that end 91 of the right-hand straight guide slit 84 which is furthest from the main conveyor belt 2. The outer arm 8 of the angle pusher 4 is projecting vertically upwards. During the advance movement of the angle pusher 4 over the main conveyor belt, the guide pin slides forwards in this guide slit 84, until it reaches the front curvature point 88 and runs into the front curved guide slit 87 and is thus swung to the left. The angular speed of this swinging movement is retarded when the guide pin 82 runs approximately tangentially into the front end 92 of the left-hand straight guide slit 83, so that the pivoting movement of the angle pusher is not halted with a jolt. While the angle pusher 4 is pushing the conveyed item 3 onto the transverse conveyor belt 6 the guide pin is introduced into the left-hand straight guide slit 83. The pivoting movement of the angle pusher 4 is begun when the guide pin 82 reaches the outer curvature point 89 of the guide slit 83 and is gently retarded in the angle zone in which the outer curved guide slit 86 opens out approximately tangentially into the outer end 91 of the right-hand straight guide slit 84. The angle pusher 4 is then again in the starting position of its operating sequence. The guide pin 82 is prevented from swinging back in the outer curved guide slit 86, for example as a result of a shock or under the effect of the weight of the angle pusher when this is not balanced in its vertical position, by a deflector 93 which automatically locks the entry point and, with a guide surface 94, completes the inner edge 96 of the right-hand straight guide slit 84. A similar deflector 98 which closes off the inner edge 97 of the left-hand guide slit 83 is arranged in the vicinity of the front end 92 of this guide slit. At this point in theory no deflector should be necessary if the guide pin 83 is held simply by the weight of the angle pusher in the left-hand guide slit 83. However, it can be expedient to blance the weight of the angle pusher with a suitably attached counterweight, in order to achieve an equal loading of the control device 27 or 79 respectively in all phases of the pivoting movement, in which case two deflectors 93 and 98 are an advantage. The deflectors 93 and 98 are constructed in the manner of inclines with a running-up surface 99 crossing over the curved guide slits 86 or 87 and the guide surface 94 acting as an obstructing surface, and they are formed as sliding parts inserted in a short guide groove, open at the top, of a guide piece 103 which forms the inner edges 96, 97, 101 and 102 of the guide slits 83, 84, 86 and 87, which sliding parts complete the housing of the guide cylinder between the guide slits 83, 84, 86 and 87. With the aid of securing rings 104, 106, 107, arranged at intervals over the length of the guide cylinder 81, the guide part 103 is attached to the guide cylinder 81 by means of securing screws 108 and 109, which on one side hold the guide part 103 on the securing rings 104, 106, 107 and on the other side hold the securing rings on the guide cylinder 81. The sliding parts of the deflectors 93 and 98, the radial thickness of which is approximately half that of the guide part 103, are constructed so that their outer housing surface 111 continues the outer surface of the guide cylinder 81 and their cross-section fills the guide groove which has a radial, plane guide surface 112 and an inner cylindrical guide surface 113. They are fitted with a guide bolt (not shown) 114 pointing in the direction of their displacement, which projects in a guide bore 112 which is coaxial to it, in which a pre-stressed compression spring 117 is arranged which presses the deflector 93 or 98 respectively into its locking position and against the spring tension of which the deflector gives way when the guide pin 82 runs up on its running-up surface.

The striker arm 9 in the conveyor belt appliance 78 shown in FIG. 5 is only approximately as long as the working cylinder 14 and is fitted on its free end with a guide ring 118 which slides on the housing of the working cylinder 14 and also supports the angle pusher 4.

Naturally, numerous variations of the construction forms described are possible without exceeding the scope of the invention. For example, using the weight of the angle pusher, a form of the connecting link guide 79 can be found in which, if a larger pivoting angle of the angle pusher 4 beyond the vertical position is used, a guide piece can be provided which only restricts the curved guide slots 87 at the front end of the guide cylinder. Further, counterweights can be arranged on the guide ring 118 of the angle pusher 4 of the conveyor belt appliance 78 or on the bridge 26 of the conveyor belt appliance 1 shown in FIG. 1, to balance out the angle pusher 4.

With suitably constructed cogwheel or coupling gear it is also possible for the striker arm 9, which in the construction forms shown is at a small radial distance from its pivot axis, to be positioned exactly on the pivot axis, thus exploiting the optimum conveyor capacity possible.

What is claimed is:

1. In a conveyor system for carrying individual items from a receiving station to a selected destination, the combination of, main conveyor means for carrying items along a straight path from said receiving station downstream through an unloading zone, a discharge conveyor extending from one side of said unloading zone along said main conveyor toward said destination and which is adapted to receive items from said main conveyor, and an item-discharge mechanism comprising a pusher arm, mounting means and operating means, said pusher arm being mounted at one of its ends on said mounting means, said mounting means being mounted for rotational and sliding movement to move said pusher arm between first and second positions on opposite sides of said main conveyor, said mounting means comprising an elongated member extending parallel to said discharge conveyor and having a forward end upon which said pusher arm is mounted, said operating means comprising means for rotating said elongated member to swing said pusher arm through 90° between a horizontal position and a vertical position and also for moving said elongated member longitudinally between an extended position wherein said forward end thereof is at the side of said main conveyor opposite the discharge conveyor wherein the pusher arm is in said first position to a retracted position wherein the forward end thereof is at the side of said main conveyor adjacent the discharge conveyor wherein the pusher arm is in said second position, said elongated member extending, in said extended position, in the path of items on said main conveyor and being remote from said main conveyor in its retracted position whereby the path of travel of items on the main conveyor is unimpeded, said operating means turning said pusher arm to said vertical position and holding it in said vertical position while it is moved to said opposite side of said main conveyor while moving said elongated member to said extended position to place said elongated member in the path of movement of items on said main conveyor to prevent items from moving downstream from said unloading zone until said pusher arm has been returned to its second position on said one side of said main conveyor, and then rotating said pusher arm downwardly to said horizontal position and retracting said elongated member from said opposite side of said main conveyor to said one side of the conveyor to return the pusher arm to its second position and move an item from said main conveyor to said discharge conveyor.

* * * * *